United States Patent [19]
Reilly et al.

[11] 3,977,822
[45] Aug. 31, 1976

[54] APPARATUS FOR CONTINUOUS STRETCH-BLOW MOLDING

[75] Inventors: Joseph R. Reilly, Naugatuck; Leonard J. Witkowski, Windsor Locks, both of Conn.

[73] Assignee: Monsanto Company, St. Louis, Mo.

[22] Filed: Dec. 22, 1975

[21] Appl. No.: 642,936

Related U.S. Application Data

[63] Continuation-in-part of Ser. No. 558,841, March 17, 1975, abandoned.

[52] U.S. Cl. .................. 425/387 B; 425/DIG. 232; 425/DIG. 216
[51] Int. Cl.[2] ........................................ B29D 23/03
[58] Field of Search .............. 425/341, 342, 387 B, 425/441, DIG. 211, DIG. 213, DIG. 216, DIG. 232, DIG. 203

[56] References Cited
UNITED STATES PATENTS

| 3,337,912 | 8/1967 | Settembrini .............. 425/DIG. 211 |
| 3,344,471 | 10/1967 | Martelli ..................... 425/DIG. 211 |
| 3,541,640 | 11/1970 | Stefaniak et al. ............... 425/326 B |
| 3,599,280 | 8/1971 | Rosenkranz et al. ....... 425/DIG. 211 |
| 3,647,341 | 3/1972 | Fischer et al. ....................... 425/326 |
| 3,718,416 | 2/1973 | Shelby ................................ 425/326 |
| 3,747,625 | 7/1973 | Reilly ............................. 425/387 B |
| 3,776,991 | 12/1973 | Marcus ..................... 425/DIG. 216 |
| 3,785,761 | 1/1974 | Logomasini et al. ............ 425/387 B |
| 3,850,562 | 4/1974 | Takeuchi et al. .......... 425/DIG. 216 |
| 3,872,203 | 3/1975 | Yoshikawa et al. ........ 425/DIG. 213 |

FOREIGN PATENTS OR APPLICATIONS 2,454,066   6/1975   Germany

*Primary Examiner*—Richard B. Lazarus
*Attorney, Agent, or Firm*—Eugene Zagarella, Jr.

[57] ABSTRACT

Apparatus for continuously forming molecularly oriented articles generally comprising a multi-station rotary stretch-blow molding machine wherein a plurality of partible blow molds angularly spaced about a continuously rotating support are provided with means for moving the mold sections of said molds between open and closed positions in synchronization with rotation of said support, additional means to longitudinally reciprocate a stretch rod within a cavity of each of said molds and further means for projecting the rod into the cavity and retracting it therefrom, said rod moving means being operable in combination and in synchronization with said mold movements. Another feature of this invention involves means for continuously and simultaneously feeding workpieces to and discharging articles from a stretch-blow mold machine. From a process standpoint, the workpiece, while at molecular orientation temperature, is held temporarily or stored at each moving mold while an article is being formed in the cavity of such mold from a prior preform.

11 Claims, 11 Drawing Figures

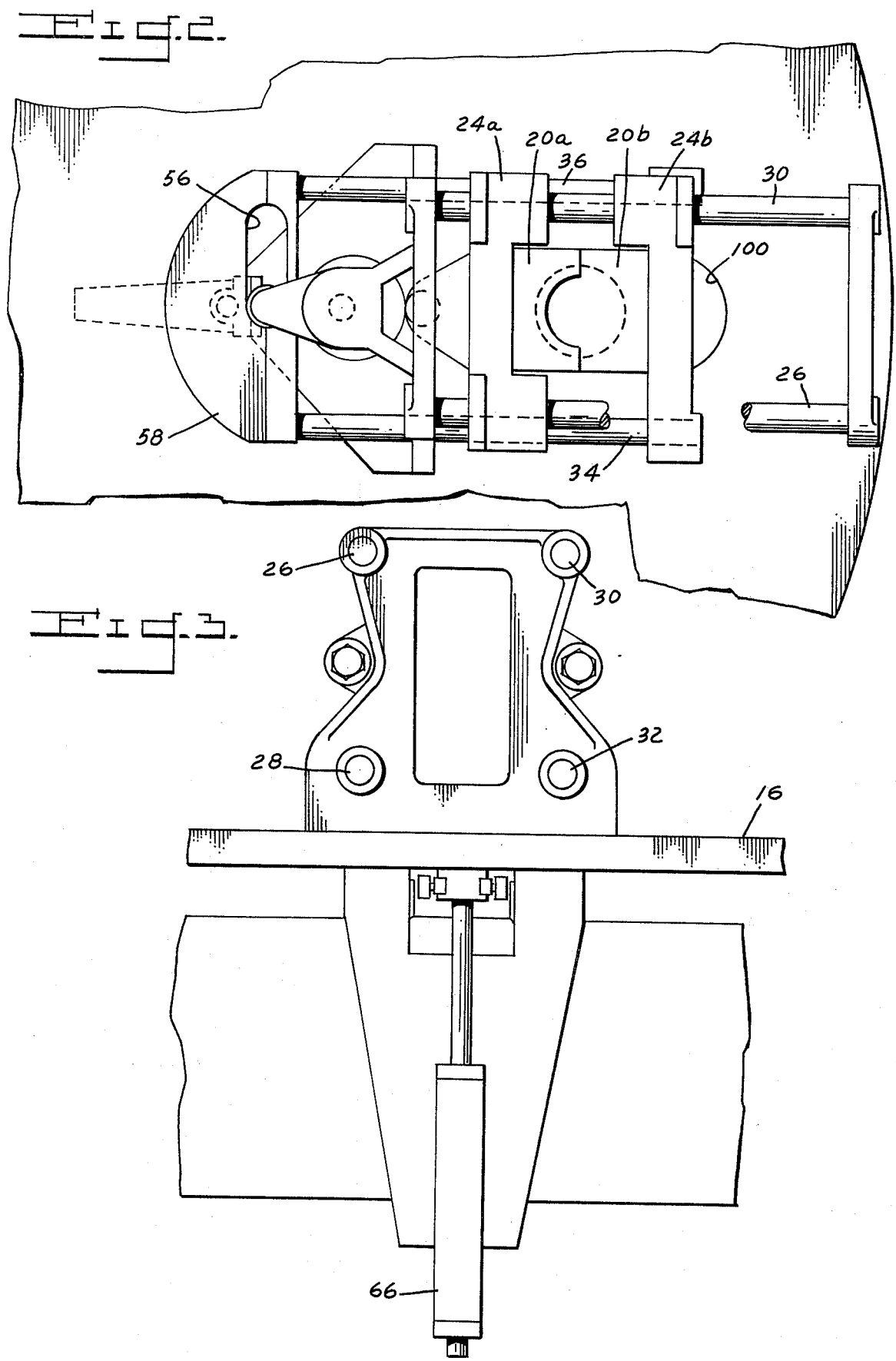

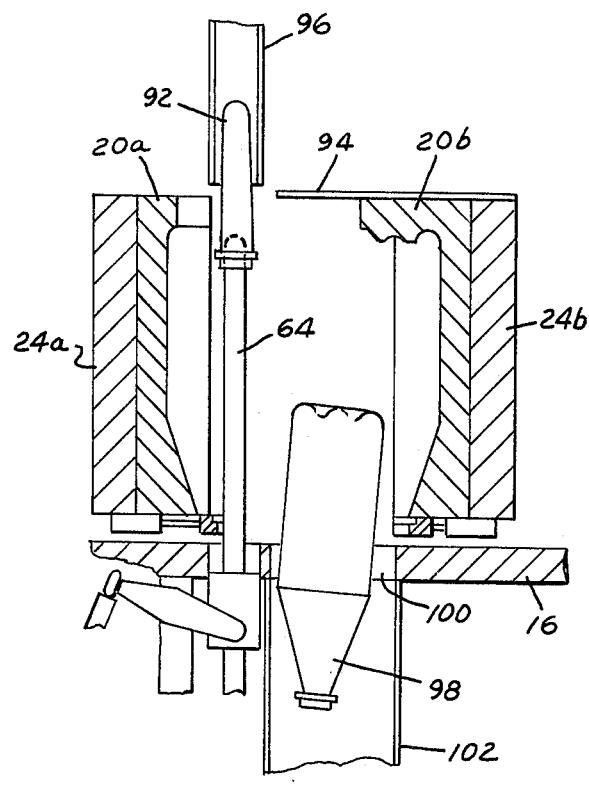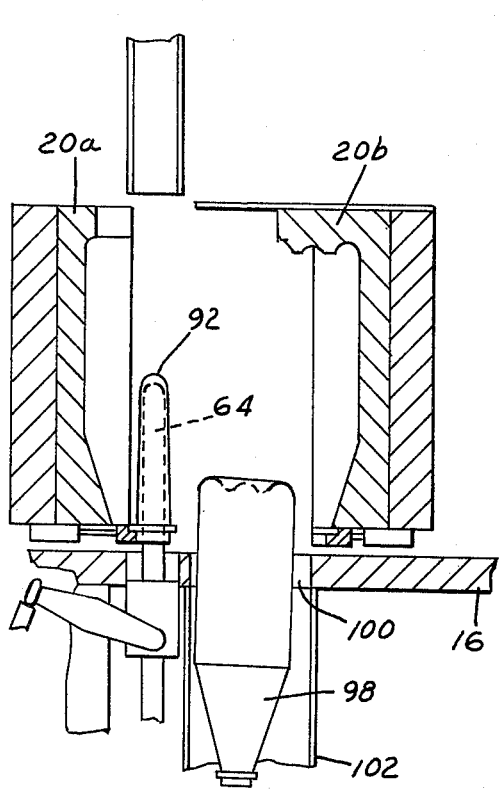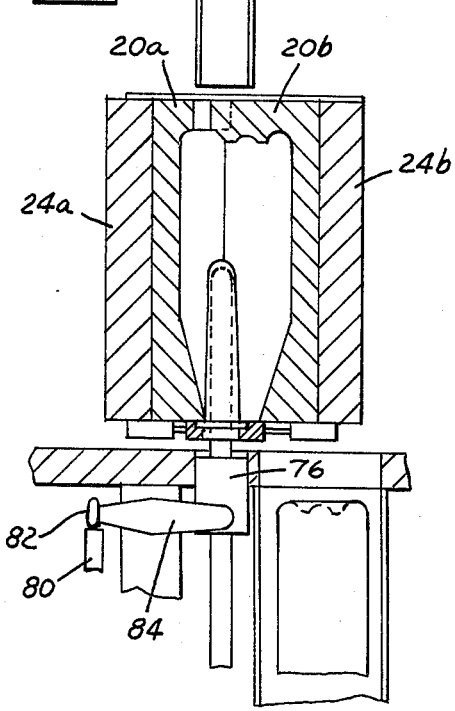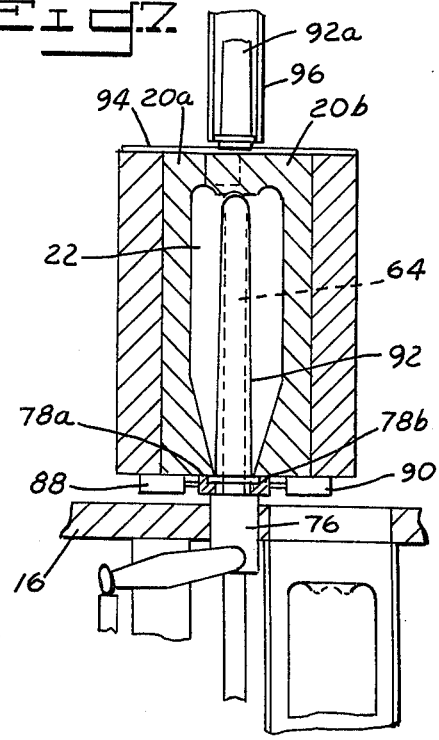

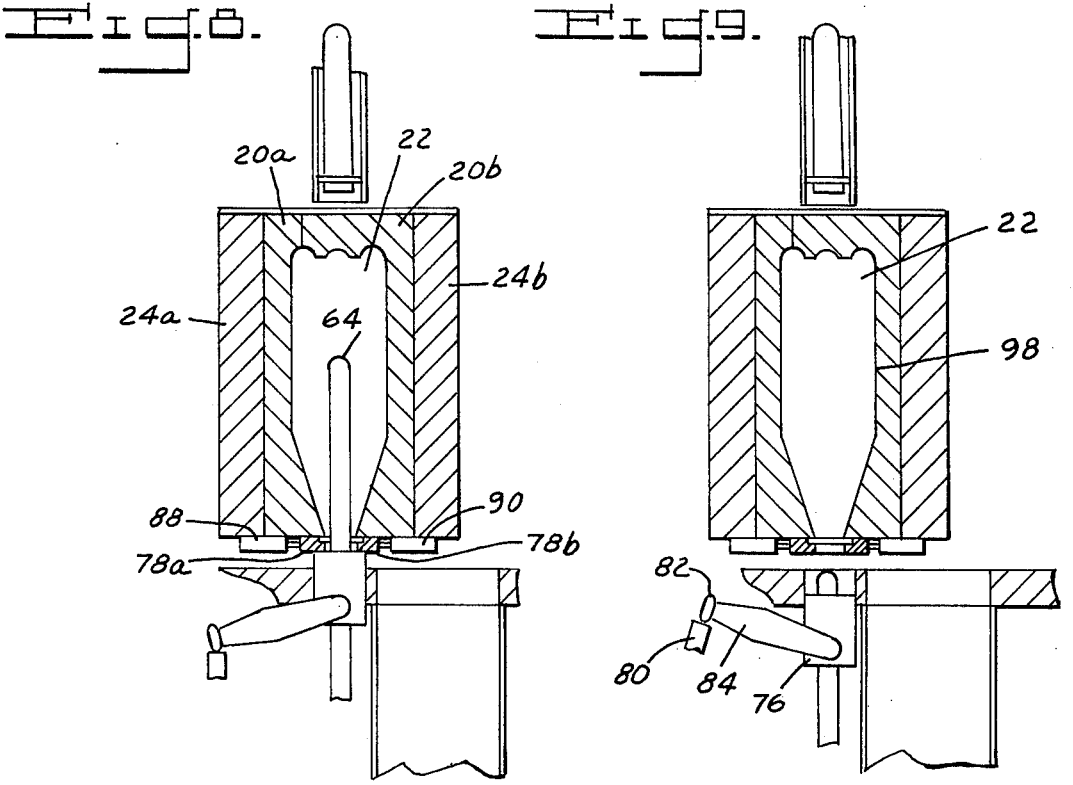
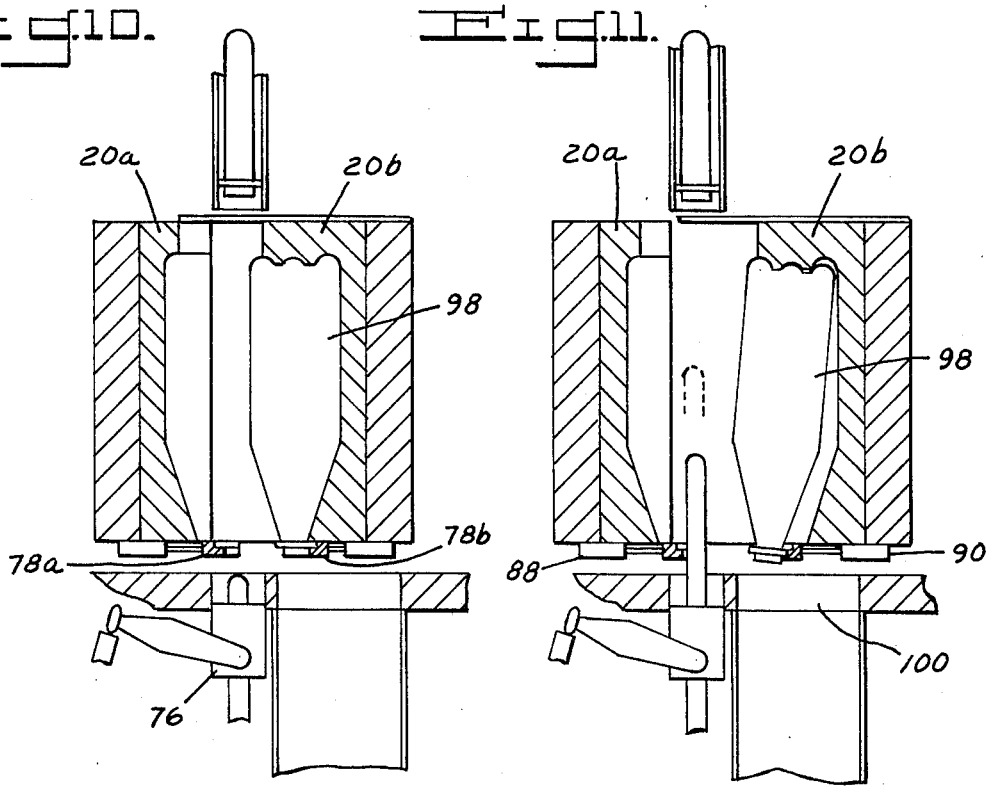

APPARATUS FOR CONTINUOUS STRETCH-BLOW MOLDING

BACKGROUND OF THE INVENTION

This application is a continuation-in-part of copending U.S. application Ser. No. 558,841 and now abandoned, filed Mar. 17, 1975.

This invention relates to method and apparatus for continuously forming molecularly oriented articles generally comprising a rotary stretch-blow mold machine.

While the blow molding art goes back over one hundred years, it has only been in the last twenty years or so that blow molding of hollow plastic articles such as containers has achieved significant commercial success. Along with the increased interest in blow molding techniques has come the strong desirability for improving the strength and other properties of finished containers prepared in this manner. Known ways of improving strength in plastic containers include changing the chemical structure of the plastic material during synthesis by means of strength imparting modifiers or increasing the wall thickness of the finished article. The former way may undesirably affect other properties of the material while the latter could be rather costly.

Another attractive way of improving the strength properties of a finished container involves the molecular orientation of the thermoplastic material being blow molded into the container. Generally speaking, molecular orientation of a suitable thermoplastic material is obtained by stretching such material while in the solid state at a termperature just below its crystalline melting point. However, while orientation can result in a substantial increase in tensile strength it cannot be obtained using a conventional blow molding operation. One method of obtaining the desired oriented product is shown in Wiley et al., U.S. Pat. No. 3,507,005 and involves extruding a hollow parison, cooling it to room temperature, carefully reheating it to just below its crystalline melting point, grasping the parison at one end while pinching or clamping it at the other end and stretching it longitudinally. Then while still held at the first end the parison is enclosed in a mold and blown to conform to the shape thereof. Such a process is somewhat complex and does not readily lend itself to the high speed fabrication which is desired in a successful commercial operation. Another method for preparing oriented containers involves the initial preparation of an elongated thermoplastic workpiece such as a preform closed at one end. The preform is then brought to the necessary temperature and placed in an enclosed mold over a rod which is extended to stretch said preform after which it is blown using pressurized air to obtain an article having the desired biaxial orientation. While such method represents an attractive way to prepare oriented containers, it must be carried out in apparatus suitable for high speed fabrication to make it economical.

Although a large number of blow molding devices suitable for continuous high speed production have been disclosed, most are directed to the conventional, non-orientation blow molding process and do not concern themselves with the method wherein a rod is extended and retracted in the mold during fabrication of the container.

SUMMARY OF THE INVENTION

Now, there has been developed an apparatus and method capable of continuously forming molecularly oriented articles, said apparatus comprising a multi-station rotary stretch-blow molding machine particularly adapted for rapid feeding and discharging from said machine.

Accordingly, a principal object of this invention is to provide a multi-station rotary stretch-blow mold machine suitable for continuous operation.

Another object of this invention is to provide apparatus for continuously forming molecularly oriented articles in a rotary stretch-blow machine wherein the movement of the molds and the stretch rod are synchronized with the rotation of a support member.

Another object of this invention is to provide a rotary stretch-blow machine wherein feeding and discharging is simultaneously carried out at each mold in combination with the mold and stretch rod moving means to create a continuous high speed operation.

A further object of this invention is to provide process improvements for increasing the efficiency of a high speed continuous blow molding system by maximizing the mold-closed period during a cycle of operation, while minimizing the complexity of the apparatus system.

Other objects of this invention will in part be obvious and will in part appear hereinafter.

These and other objects are accomplished by providing an apparatus for continuously forming molecularly oriented articles generally comprising a plurality of radially partible blow molds disposed at angular intervals on a support mounted on a frame and adapted for continuous rotation about a substantially vertical axis, means for moving the mold sections of said molds between open and closed positions in synchronization with rotation of said support, stretch rod means permanently mounted with each mold and operable in combination with said mold moving means and including rod positioning means for longitudinally reciprocating a rod while within a cavity of said mold, pressurized fluid means associated with said rod and a vertical container discharge chute in the vicinity of the cavity of each mold.

In another embodiment of this invention, a stretch-blow mold machine having a stretch rod which is reciprocally movable both within the mold cavity and into and out of the cavity is provided with means for simultaneously feeding a workpiece while discharging a molecularly oriented blown article.

From a process standpoint, there is provided in the process of blow molding articles from preforms which includes the steps of positioning such preforms within cavities of continuously moving and successively presented blow molds, distending the preforms within the moving molds to form the articles and discharging the articles from the still-moving molds at an eject station prior to charging with additional preforms, the improvement comprising holding or storing a preform temporarily at each such moving mold while an article is being formed in the cavity therein from a prior preform.

BRIEF DESCRIPTION OF THE DRAWINGS

In describing the overall invention, reference will be made to the accompanying drawings wherein:

FIG. 2 is a schematic plan view showing one mold station of the rotary blow molding machine;

FIG. 3 is a schematic front elevational view of one mold station of the rotary blow molding machine; and FIGS. 4–11 are partially sectioned elevational side views showing the sequence of operation of one mold station at various times during its rotation about the rotary support.

DETAILED DESCRIPTION OF THE ILLUSTRATED EMBODIMENTS

Figure 1:
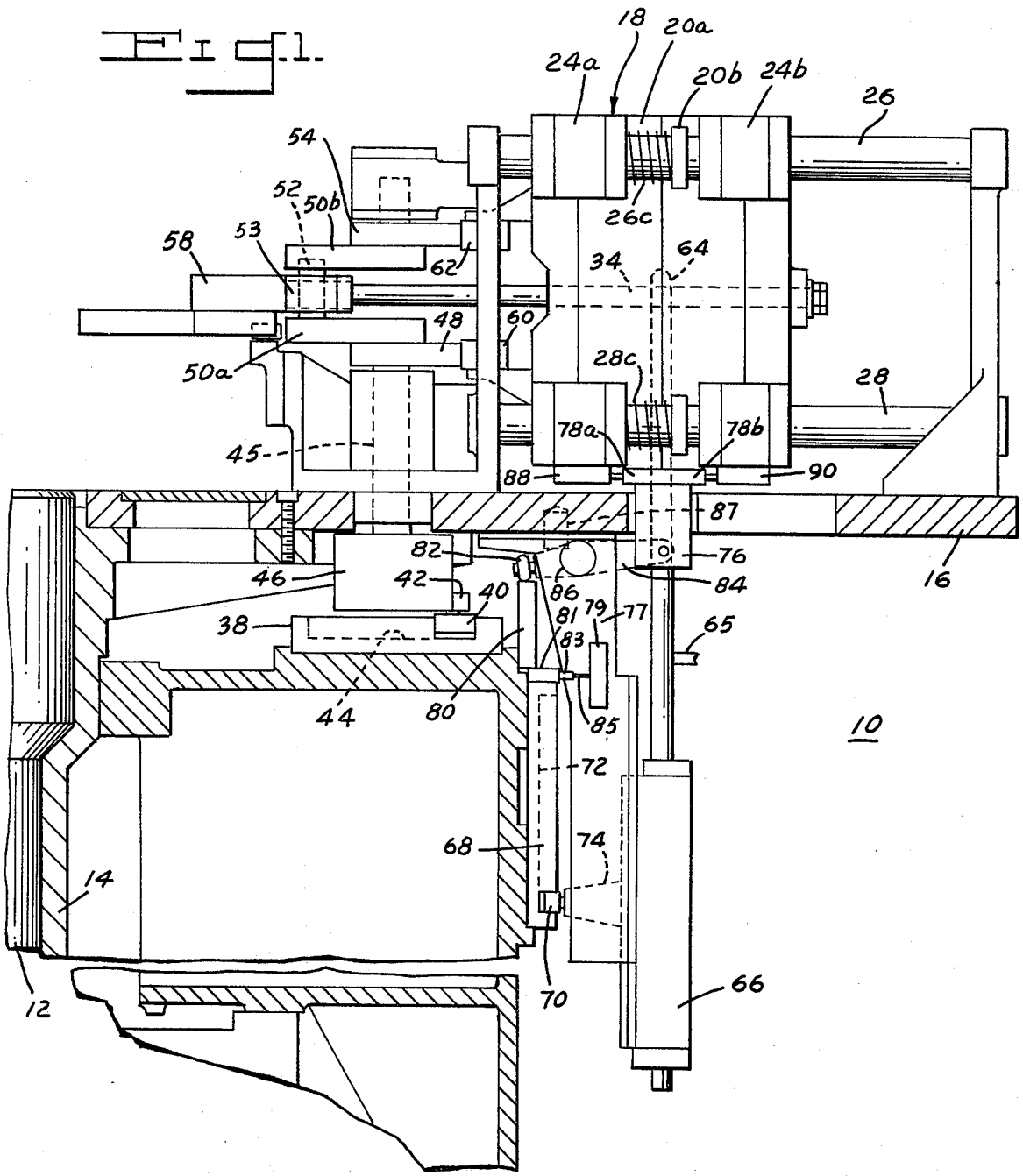
FIG. 1 is a schematic side elevational view showing one mold station of the rotary blow molding machine and incorporating the novel apparatus components of this invention.

Referrring now to the drawings, there is illustrated in FIG. 1 a rotary blow molding machine designated generally as 10 for continuously forming molecularly oriented articles such as containers and particularly bottles. Only one mold station is shown, however a plurality of identical mold stations are equally spaced at intervals around the periphery of the supporting structure.

Blow mold machine 10 comprises a vertical shaft 12 carrying a hub 14 for continuous rotation therewith by conventional drive means such as a motor, gear reducer, or the like, not shown. Fixedly attached to hub 14 is a circular mold supporting plate 16.

A plurality of identical mold units generally indicated by the numeral 18, only one of which is shown and which will be described hereafter in detail, are equally spaced about the supporting plate 16. Each of the mold units 18 comprise partible mold sections 20a and 20b which in the closed position define cavity 22, the surface of which conforms to the shape of the body of a hollow article such as a bottle to be molded therefrom from a thermoplastic material (see FIG. 8). Mold sections 20a and 20b may be conventionally secured (e.g. by bolts or clamps) in mold platens or carriers 24a and 24b which in turn are operatively associated with the remainder of the apparatus in a manner to be described hereafter in more detail.

Each platen 24a and 24b of partible mold unit 18 is slidably supported by guide rods 26, 28, 30 and 32 which also maintain the alignment of the platens and attached molds (see FIG. 3). The four guide rods are fixedly attached to the supporting structure which is mounted on the supporting plate 16.

Outer mold section 20b and platen 24b is reciprocally moved between open and closed positions by the movement of the rods 34 and 36 (FIG. 2) which are secured to the platen by any conventional means and illustrated e.g. by bolts (FIG. 1). Actuation of mold movement is synchronized with the rotation of the supporting plate 16 through the use of a scotch yoke assembly, or equivalent, as described below.

As illustrated in FIG. 1 mold opening and closing cam 38 is fixedly attached to the base of the machine. Cam roller or follower 40 is attached to lever 42 and moves within the contoured slot 44 found in cam 38. Lever 42 is connected to shaft 45 through detent (torque limiting device) and gear assembly 46. The shaft 45 is connected to a cam or eccentric member 48 and this to a pair of crank or lever arms 50a and b. The lever arms are connected through connecting pin 52 and bearing 53. Lever arm 50b is attached to another cam 54. The bearing 53 is free to move about the connecting pin and fits into a slot 56 on plate 58 of the scotch yoke assembly (FIG. 2). Tie rods 34 and 36 which are secured to the outer mold section 20b and platen 24b are fixedly attached to the plate 58 of the scotch yoke assembly and reciprocally move in a lateral direction with rotation of the shaft 45 through the action of the components described above.

Inner mold section 20a and platen 24a also move with rotation of the shaft 45 but to a lesser degree than the outer mold. This is accomplished through the interaction of cams 48 and 54 and their associated rollers 60 and 62. The rollers are attached to platen 24a which in turn is supported and reciprocally slides on guide rods 26, 28, 30 and 32. The inner mold section 20a is moved through the force of springs 26c and 28c positioned on guide rods 26 and 28 respectively (FIG. 1) and those on guide rods 30 and 32 (not shown) which push against platen 24a and the rollers 60 and 62 as cams 48 and 54 move to the left when the mold is opening.

In synchronization with movement of the mold sections, the stretch rod 64 is being moved to the desired operating positions through use of the following means. The stretch rod 64 is moved between its fully extended position (FIGS. 4 and 7) and its position just prior to the start of the stretching operation (FIGS. 5 and 6) through the movement of housing means such as air cylinder 66 by the action of air cylinder cam 68 and air cylinder cam roller (follower) 70. The stretch rod 64 is affixed to the air cylinder shaft (not shown) in air cylinder 66 and moves in combination with said air cylinder and shaft. Air cylinder 66 is connected to cam roller 70 by means of bracket 74. The bracket 74 and air cylinder 66 slide in ways or tracks (not shown) in the supporting structure or frame designated generally as 77 which is attached to rotating support 16. As the support 16 rotates, the air cylinder 66 moves in the tracks via interaction with cam roller 70 which moves within the slot 72 of cam 68 which is fixedly attached to the non-moving base of the machine. Cam 68 shown as a box cam travels all the way around the rotary machine and depending on the shape or direction of the contoured slot 72, cam roller 70 and the connected air cylinder 66 and associated structural components move up and down as desired as the support 16 rotates. By this action the stretch rod 64 is raised from the beginning of the stretch operation (FIG. 6) to its fully extended position (FIG. 7).

In the embodiment illustrated, the withdrawal of stretch rod 64 from the mold cavity 22, i.e. from its stretch beginning or after blow position (FIG. 6 and 8) to its complete removal from the cavity (FIGS. 9 and 10) is carried out by the application of air to the top side of the piston (not shown) in air cylinder 66. This causes the shaft attached to the piston and the connected stretch rod 64 to be pushed downward lowering said rod into sealing plug 76 as shown in FIGS. 9 and 10. Application of air pressure is through valve 79 and actuation of this valve is caused through interaction of cam 81, fixed to the base of the machine, and cam roller 83 connected to the valve by rod or shaft 85. The valve 79 is affixed to the supporting structure 77 in a conventional manner not shown and rotates with said structure as support 16 to which it is attached is rotated. The cam roller 83 travels along cam 81 completely around the machine and by its movement it changes the direction of valve 79 causing air to be applied to one side or the other of the piston in the air cylinder thereby raising or lowering the stretch rod 64. Air is also being applied when the stretch rod is being moved within the cavity by the interaction of cam 68 and cam roller 70. This air is applied to the bottom of the piston in air cylinder 66 through air valve 79 and keeps the stretch rod 64 extended during this part of the cycle. The actual air supply connections from valve 79 to the air cylinder 66 has not been shown so as not to further complicate the drawings and distract from the essential features of this invention.

In the embodiment illustrated in FIGS. 7–10, neck jaws 78a and 78b open and close around the neck of the workpiece and blown article through the movement of air cylinders 88 and 90 which are affixed to the mold sections 20a and 20b and platens 24a and b. The respective jaws can be further moved, for reasons to be described below, by movement of the respective pistons and connected shafts of the air cylinders 88 and 90. Actuation of such movement can be by any of the conventional means, not shown, such as a cam or dog fixed to the base of the machine which trips limit switches to open or close the air supply valve.

Sealing plug 76 is moved up to seal the neck of the workpiece and the stretch rod when the mold is closed through means of sealing plug cam 80 and sealing plug cam roller 82 (FIG. 1). Cam 80 is attached to the nonmoving base of the machine and cam roller 82 travels in an up and down manner along the cam thereby moving the sealing plug which is attached to it via the action of lever 84 and eccentric member 86 as the support 16 rotates. Spring 87 (FIG. 1) holds the plug 76 when it is in sealing engagement and thus cam 80 does not have to completely go around the machine and may only be placed in positions where the sealing plug 76 is to be lowered. In other words the cam roller 82 can be allowed to travel freely until it again engages the cam 80.

As shown in FIGS. 4–11, means are provided to rapidly feed workpieces 92 and discharge blown articles 98 from each stretch-blow mold. A plate 94 is affixed to outer mold section 20b and platen 24b and moves in a lateral manner along with the movement of such parts through rotation of support 16 and the means described above. The workpiece or preform 92 is dropped into guide means, i.e. a chute or funnel 96 preferably located in the vicinity of the cavity of each mold station by a conventional pick and place device or other means. The vertical chute or workpiece-holder 96 is supported in a conventional manner, not shown, preferably by support 16 or by some other structure or apparatus and along with plate 94 provides a means for guiding and retaining the workpiece 92 until the mold has opened and stretch rod 64 is in position to receive it and start the sequence for forming an article. At the same time, a blown article such as bottle 98 is being discharged from the mold through opening 100 in support 16, associated with a conventional discharge chute, as shown. Alternatively, such discharge opening and chute suppported from support 16 could be upwardly disposed on the axis at cavity 22 to accomodate an upwardly discharging system. The bottle 98 is retained in the outer mold section 20b by means of the overlay section at the top of outer mold 20b and through jaw means i.e., the right neck jaw 78b which has a shape or configuration which surrounds a significant portion or section of the neck of the bottle 98 (FIG. 10). Thus the bottle moves with the right hand mold 20b and neck jaw 78b. When the bottle is generally over opening 100 (FIG. 11), the neck jaw 78b is pushed laterally to the left by actuation of the air cylinder 90 and its connecting shaft thereby releasing the bottle from the mold section of half 20b.

In alternative systems to that just described, for example one wherein the articles are discharged upwardly from the open mold, cylinder 66 and its associated air circuitry may not be required since it will not be necessary to completely extract rod 64 from the mold cavity with such systems. Or, even with such just-described arrangement, it may be possible via proper cam designs to retract the rod from the cavity via the mechanical cam-follower system above described.

To put the apparatus in proper perspective and particularly to describe the synchronized action of the respective components, the operation will be described with particular reference to FIGS. 4–11 which show the sequence of events taking place in one selected mold at different times as the support 16 is being rotated.

The operation begins as shown in FIG. 4 when a new workpiece 92 such as a previously formed thermoplastic preform which has been reheated to orientation temperature and having a tubular body with one open end and one closed end is dropped onto a fully extended stretch rod 64 and a formed bottle 98 is fully separated from mold section 20b and beginning its descent through discharge opening 100. The preform 92 is free to drop onto the rod extending upwardly on the axis of the mold cavity since plate 94 has been moved along with mold section 20b and platen 24b thereby clearing the lower end of chute 96 above the now open mold.

In the next step shown in FIG. 5, the bottle 98 is now dropping out of the mold cavity into opening 100 and optional chute or funnel 102. During this time the stretch rod 64 holding the newly charged preform 92 is retracting (lowering) to its normal start (stretch beginning) position. This is carried out by rotation of support 16 causing cam roller 70 to move within the slot 72 to the lower position in cam 68. The air cylinder 66 being affixed to the roller through bracket 74 thereby moves in tracks in the frame or supporting structure lowering the stretch rod 64 and the preform 92 to its position where stretching begins. Application of air to the lower side of the piston in air cylinder 66 keeps the stretch rod 64 steady during movement and also retains its in the position to which lowered through the action of cam 68 and cam roller 70 (see FIG. 1).

As the support 16 continues to rotate, the mold sections 20a and 20b and their respective platens 24a and 24b are beginning to close as shown in FIG. 6. This happens through interaction of the mold opening and closing roller 40 in the contoured slot 44 of mold opening and closing cam 38 (FIG. 1). The roller 40 moves with rotation of the support 16 causing the shaft 45 to rotate through the action of connecting lever 42 and thereby causes the scotch yoke assembly and particularly lever arms 50a and 50b to rotate. This action causes the rods 34 and 36 which are connected thereto to reciprocally move in a lateral direction thereby beginning to close outer platen 24b and its mold section 20b. At the same time inner mold section 20a is also moving toward a closed position through movement of cams 48 and 54 to the right causing rollers 60 and 62 to move in that direction along with platen 24a which is attached thereto (see FIG. 1). It is to be noted that rotation of the scotch yoke assembly and particularly lever or crank arms 50a and 50b is desirably slightly greater than 180° to make the mold sections squeeze together when closed and thereby lock themselves through the added tension or clamping force. Cam 38 does not have to go completely around the machine and may only be placed in sections where opening and closing of the mold is desired.

As the mold sections 20a and 20b close, the neck jaws 78a and 78b also close around the neck of preform 92 through movement of air cylinders 88 and 90 which are attached to said mold sections and platens 24a and 24b. At the same time, the sealing plug 76 begins to move up through the action of sealing cam 80, sealing cam roller 82 and lever 84 as shown also in FIG. 6.

When the mold sections 20a and 20b reach their fully closed position as shown in FIG. 7, sealing plug 76 moves up to seal the neck of the preform 92 and the stretch rod 64.

After the mold closing action is complete and the mold cavity 22 fully sealed, the preform is distended from the article. Preferably, the stretch rod 64 begins to raise via movement of cam roller 70 in cam 68 through continued rotation of support 16 (see FIG. 1). This action causes the tightly held preform 92 to stretch longitudinally as the rod 64 approaches and reaches its fully extended position shown in FIG. 7. When the rod is fully extended, pressurized air is provided through openings (not shown) in rod 64 via air supply means 65 causing stretch in the radial direction, the preform 92 thus becoming fully stretched and biaxially oriented. Blow air may alternately be provided through the sealing plug in a manner not shown.

Due to the closing of the mold, plate 94 is returned to its position below chute 96 and a new preform 92a is dropped into the chute by external means (not shown) and retained or obstructed in its passage by said plate 94. The preform 92a is now ready for feeding to the blow mold station below (FIG. 7). Holding or storing a preform 92, which has been inserted in holder 96 from an upstream station, temporarily in such holder 96 at each moving mold station while an article is being formed in such mold from a prior preform in the manner illustrated increases the period during which the mold may remain closed and functioning on the prior charged preform. In other words, if the preform were to be charged directly to the mold from the prior upstream station, as opposed to merely dropping onto rod 64 from a position already at such continuously moving station, the mold stations would have to remain open longer during each cycle, and thus for a system of equivalent capacity to that illustrated, additional stations would have to be added, thus increasing the complexity of the system. Therefore, system efficiency is substantially increased by loading individual preforms 92 at a charging station into holders 96 adjacent to and moving with such molds while articles are being formed within such molds from prior preforms. The molds are then charged directly from such holders, preferably while the preforms are at molecular orientation temperature, during or after discharging articles formed from prior preforms from themolds at the eject station, and while the molds traverse a closed circular path.

After completing the stretching and blowing operation, the stretch rod 64 begins to retract through the action of cam roller 70 in cam 68 via continued rotation of support 16. The rod then reaches its intermediate position within the cavity 22 as shown in FIG. 8.

The stretch rod 64 continues to retract until it is free of the mold cavity 22 as shown in FIG. 9. This happens when continued rotation of support 16 causes cam roller 83 to move along cam 81 thereby actuating valve 79, allowing air to be applied to the upper side of the piston housed in air cylinder 66 pushing the attached rod in a downward position. The mechanical and pneumatic retracting actions described above may be carried out simultaneously. Simultaneously, sealing plug begins to retract from its seated position to release the blow air from the blown bottle 98. This is actuated through movement of the roller 82 along cam 80 in cooperation with lever 84.

The stretch rod 64 and seal plug 76 is now fully retracted and the mold sections 20a and 20b begin to open with continued rotation of support 16 through the action of roller 40 and cam 38, reversing the closing operation described above (see FIG. 10). The formed bottle 98 is carried along with the outer mold section 20b and is held there by the shape or configuration of the overlay at the top of said section (bottom portion of bottle) plus the configuration of the surrounding neck jaw 78b. To aid in the movement of the formed bottle 98 with outer mold section 20b, as the mold begins to open neck jaw 78a is moved laterally to the right against the neck of said bottle by action of air cylinder 88 and its connecting shaft. This added force helps the outer mold section 20b retain the formed bottle when the mold seal is first broken and the respective mold halves are separating.

As shown in FIG. 11, the outer mold section 20b has now moved into position generally above discharge opening 100 in support 16. At this time, the bottle 98 is now released from its retention by outer mold section 20b by lateral movement of neck jaw 78b to the left through actuation of air cylinder 90 causing the neck of the bottle 98 and the bottom thereof (facing up) to move clear of the mold section. At the same time stretch rod 64 begins to extend itself between the mold sections 20a and 20b through the application of air to the lower side of the piston housed in cylinder 66, or alternatively via coaction between follower 70 and cam 68 reversing the retraction procedure described above. Alternate means such as forced air means may be provided in outer mold 20b to help push the bottle out.

The sequence is complete, when the stretch rod 64 continues to fully extend itself between the open mold sections 20a and 20b as shown in FIG. 4. This is caused by the movement of cam roller 70 in cam 68 through continued rotation of support 16, reversing the procedure described above for retracting the rod. The rod 64 is now in position to receive a new preform 92 and begin the sequence of operation again.

The embodiments described above show a preferred rotary stretch-blow molding machine wherein the operation of the blow molds are synchronized with movement of the respective stretch rods to provide a facility capable of preparing molecularly oriented articles in a rapid continuous manner thereby saving time and also saving space by the compactness of the arranged equipment.

Variations in the equipment, as would be obvious to one of ordinary skill in the art, may be implemented. For example, the opening and closing movements of the mold sections may be performed in a more conventional manner, wherein both mold sections are moved an equal amount. However of course, the advantage of economizing on space as presented by the preferred embodiment of this invention is particularly strong when commercial operations are involved. It is further noted that both rod positioning means may be actuated by mechanical means such as cams, however, it is considered more practical for commercial operations to use the preferred combination of mechanical and pneumatic means. While the actuation devices shown are a preferred embodiment, other conventional electrical, mechanical, fluidic and instrumentation means may be used including for example electric timers, solenoids, cams, pneumatic and hydraulic cylinders, switches, etc.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. Apparatus for continuously forming molecularly oriented articles comprising:
   a. a frame;
   b. a support on said frame mounted for continuous rotation about a substantially vertical axis;
   c. a plurality of radially partible blow molds disposed at angular intervals on said support, each mold defining a cavity;
   d. means for moving said molds between open and closed positions;
   e. means synchronizing said mold moving means with the rotation of said support; and
   f. a plurality of stretch rod means, each permanently mounted for operation with an individual mold and operable in combination with said mold moving means and including:
      i. rod positioning means for longitudinally reciprocating a rod to stretch the workpiece while within said cavity of said mold; and
      ii. pressurized fluid means associated with said rod for expanding the workpiece into a formed article;
   said support having a vertical container discharge chute in the vicinity of the cavity of each mold.

2. The apparatus of claim 1 wherein said rod positioning means comprises:
   a. housing means for supporting the bottom of said stretch rod and adapted to reciprocally move in combination therewith;
   b. cam means for longitudinally moving said housing and said stretch rod including a box cam mounted on said frame and a cam roller for movement within a contoured slot of said cam and operatively connected to said housing.

3. The apparatus of claim 1 including second rod positioning means for projecting said rod into said cavity and extracting it therefrom.

4. The apparatus of claim 2 including second rod positioning means for projecting said rod into said cavity and extracting it therefrom and comprising valve means for supplying pressurized fluid to either side of a reciprocally movable piston located within said housing, said piston being fixedly attached to said stretch rod and movable therewith, means attached to said frame for actuating said valve upon rotation of said support to supply fluid to the selected side of the piston thereby longitudinally moving the stretch rod.

5. The apparatus of claim 4 wherein said mold moving means comprise:

a. first rod means attached to said frame for slidable supporting and guiding movement of the two mold sections of said partible molds;
   b. second rod means attached to one of said mold sections and reciprocally movable therewith in a lateral direction;
   c. means for laterally moving said second rod means including:
      i. scotch yoke assembly means attached to said second rod means;
      ii. rotating shaft means for operatively working in engagement with said scotch yoke assembly to provide reciprocal movement to said attached second rod means;
      iii. cam means for providing rotational movement to said rotary shaft in synchronization with movement of said support and including a box cam affixed to said frame and a cam roller for movement within a contoured slot of said box cam and operatively connected to said shaft by lever means.

6. The apparatus of claim 5 including means to continuously feed preforms to and discharge articles from said mold and including:
   i. plate means positioned above said mold for selectively obstructing passage of a preform to said mold cavity, said plate means adapted to reciprocally move in combination with one of said mold sections;
   ii. guide means associated with said plate means and fixedly positioned above said plate means and the center of said cavity so as to retain a preform on said plate means above the center of said mold cavity when said mold is closed and until said plate means has moved past the center of said cavity clearing the obstruction;
   iii. means for releasably retaining a formed article in one mold section while said section is moving to open said mold including:
      a. an overlay section at the top of said mold section and
      b. jaw means positioned at the bottom of said mold section and surrounding one section of the formed article and adapted to reciprocally move in combination therewith;
   iv. means associated with said jaw means for reciprocally moving said jaw means in a lateral direction against said article thereby releasing it from said mold section when said mold is open and said mold section is above said discharge opening in said support.

7. The apparatus of claim 6 including jaw means positioned at the bottom of said second mold section and adapted to reciprocally move in combination therewith, and additional means associated with said jaw means of said second mold section for reciprocally moving said jaw means in a lateral direction against said article as the mold begins to open thereby maintaining said article within the configuration of the first mold section for movement therewith.

8. A stretch-blow mold apparatus for continuously forming molecularly oriented articles comprising:
   a. a mold having a pair of partible mold sections disposed on a support and defining a cavity, said support having a discharge opening therein in the vicinity of the cavity of said mold;
   b. means for moving said mold sections between open and closed positions;

c. stretch rod means for said mold operable in combination with said mold sections moving means and including means to move said stretch rod within said cavity and into and out of said cavity;

d. pressurized fluid means associated with said rod for expanding a workpiece into a formed article; and e. means to continuously and simultaneously feed preforms to and discharge articles from said mold and including:

i. plate means positioned above said mold for selectively obstructing passage of a preform to said mold cavity said plate means adapted to reciprocally move in combination with one of said mold sections;

ii. guide means associated with said plate means and fixedly positioned above said plate means and the center of said cavity so as to retain a preform on said plate means above the center of said mold cavity when said mold is closed and until said plate means has moved past the center of said cavity clearing the obstruction;

iii. means for releasably retaining a formed article in one mold section while said section is moving to open said mold including:

a. an overlay section at the top of said mold section; and b. jaw means positioned at the bottom of said mold section and surrounding one section of the formed article and adapted to reciprocally move in combination therewith;

iv. means associated with said jaw means for reciprocally moving said jaw means in a lateral direction against said article thereby releasing it from said mold section when said mold is open and said mold section is above said discharge opening in said support.

9. The apparatus of claim 8 including jaw means positioned at the bottom of the second mold section and adapted to reciprocally move in combination therewith and additional means associated with said jaw means of said second mold section for reciprocally moving said jaw means in a lateral direction against said article as the mold begins to open thereby maintaining said article within the configuration of the first mold section for movement therewith.

10. The apparatus of claim 9 wherein said stretch rod moving means include:

i. first rod positioning means for longitudinally reciprocating a rod while within a cavity of said mold and ii. second rod positioning means for projecting said rod into said cavity and extracting it therefrom.

11. The apparatus of claim 1 wherein said support includes a vertical workpiece-holder in the vicinity of the cavity of each mold.

* * * * *